United States Patent
Enomoto

(10) Patent No.: US 6,907,145 B2
(45) Date of Patent: Jun. 14, 2005

(54) IMAGE PROCESSING APPARATUS, CERTIFICATION PHOTOGRAPH TAKING APPARATUS, AND CERTIFICATION PHOTOGRAPH CREATION SYSTEM

(75) Inventor: Jun Enomoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 517 days.

(21) Appl. No.: 09/740,815

(22) Filed: Dec. 21, 2000

(65) Prior Publication Data
US 2001/0004406 A1 Jun. 21, 2001

(30) Foreign Application Priority Data
Dec. 21, 1999 (JP) ............................................ 11-362428

(51) Int. Cl.[7] ................................................ G06K 9/36
(52) U.S. Cl. ........................ 382/282; 382/190; 382/198
(58) Field of Search ................................ 382/100, 190, 382/237, 282, 176, 299; 358/453, 462, 464, 487, 500, 506, 518, 519, 527, 474, 534; 355/26; 345/620; 348/64

(56) References Cited

U.S. PATENT DOCUMENTS

| | | | |
|---|---|---|---|
| 5,199,081 A | * | 3/1993 | Saito et al. ................. 382/116 |
| 5,383,035 A | * | 1/1995 | Suzuki ........................ 358/500 |
| 5,625,721 A | * | 4/1997 | Lopresti et al. ............. 382/309 |
| 5,784,488 A | * | 7/1998 | Kuwata ....................... 382/176 |
| 6,211,484 B1 | * | 4/2001 | Kaplan et al. ......... 219/121.68 |
| 6,266,129 B1 | * | 7/2001 | Uzawa et al. ................. 355/40 |

FOREIGN PATENT DOCUMENTS

| | | |
|---|---|---|
| JP | 8-125909 | 5/1996 |
| JP | 11-17780 | 1/1999 |

* cited by examiner

Primary Examiner—Kanjibhai K. Patel
Assistant Examiner—Abolfazl Tabatabai
(74) Attorney, Agent, or Firm—Morgan, Lewis & Bockius LLP

(57) ABSTRACT

The image processing apparatus subjects input image data to predetermined image processing to create output image data to be output as a print. The processing apparatus includes an extracting device for extracting a main subject from the input image data and a first determining device for determining a print magnification and a frame position in accordance with a size of the extracted main subject and a previously designated print size. The processing apparatus optionally includes a second determining device for determining a use of the print from an identification code input when a photograph is taken. The certification photograph taking apparatus includes an inputting device for inputting an identification code indicating a use of a print and optionally a print size. The certification photograph creation system includes the certification photograph taking apparatus, an image inputting apparatus for inputting a photographed image, the image processing apparatus and a printer for outputting an image having been subjected to the image processing as a certification photograph. The processing apparatus, the taking apparatus and the system are capable of simply and easily taking and/or creating the certification photograph.

13 Claims, 8 Drawing Sheets

IMAGE PROCESSING APPARATUS, CERTIFICATION PHOTOGRAPH TAKING APPARATUS, AND CERTIFICATION PHOTOGRAPH CREATION SYSTEM

BACKGROUND OF THE INVENTION

The present invention relates to a technology of an image processing apparatus, a certification photograph taking apparatus and a certification photograph creation system for taking and/or creating a certification photograph.

Hitherto, a certification photograph must be taken by a professional photographer in a studio. This is because that it is difficult for an armature photographer to determine the position where a main subject is to be located in the frame of a photograph and to determine the size of the main subject in the frame based on the size of an aimed certification photograph. Further, when a customer requests a photo-labo to create a certification photograph from a photographic film on which an image is recorded by him or her, usually, it is necessary to perform so-called trimming for cutting a portion of the image in accordance with the size of a certification photograph and reproducing the cut portion as a photograph having a necessary size. At this time, in a conventional photoprinter employing direct exposure, the trimming is carried out in such a manner that after the unnecessary region of an image recorded on a film is masked and the film is aligned, light is projected through an image region cut by the trimming so as to enlarge the cut image and a light-sensitive material is exposed by the light projected thereto.

In contrast, recently, a digital photoprinter has been in practical use which is arranged such that an image recorded on a film is read photoelectrically and converted into digital signals, which are subjected to various kinds of image processing to produce recording image data; and a light-sensitive material is exposed by scanning with recording light modulated in accordance with the image data, thereby recording a (latent) image that is then processed photoelectrically to produce a (finished) print. According to the digital photoprinter, trimming can be more easily carried out with a higher degree of freedom by cutting an image by the image processing and employing electronic magnification processing. However, even if the trimming is carried out by the digital photoprinter, the processing such as cutting of an image and electronic magnification is a special job that is time-consuming to an operator, and productivity is reduced by the processing.

To cope with the above problem, various types of trimming technologies which are performed by the digital photoprinter have been proposed.

For example, Japanese Unexamined Patent Application Publication No. 11-17780 discloses an art in which the aspect ratio of a trimming region is set by being selected or calculated in accordance with the size of an output image and trimming is instructed in accordance with the thus set aspect ratio.

Further, Japanese Unexamined Patent Application Publication No. 8-125909 discloses an art in which the recorded image data of a predetermined region is extracted from recorded image data output from a photographing camera, a background color is recognized from the extracted image data having been recorded, an aimed image is cut based on the recognized background color and framing control is carried out so that the aimed image having been cut is located at a desired position.

However, these conventional technologies still have room to be further improved from the view point of simple creation of a certification photograph because they do not aim at the creation of the certification photograph.

SUMMARY OF THE INVENTION

Accordingly, it is an object of the present invention, which was made in view of the above conventional arts, to provide an art such as an image processing apparatus, a certification photogaph taking apparatus and a cerification photogaph creation system, capable of simply and easily taking and/or creating a certification photograph.

In order to attain the object described above, the present invention provides an image processing apparatus for subjecting input image data to predetermined image processing to create output image data to be output as a print comprising: an extracting device for extracting a main subject from the input image data; and a first determining device for determining a print magnification and a frame position in accordance with a size of the extracted main subject and a previously designated print size.

It is preferable that the image processing apparatus further comprises a second detemining device for determining a use of the print from an identification code input when a photograph is taken.

Preferably, the print size is designated by inputting an print size together with the identification code when the photograph is taken.

When an image having been subjected to the image processing is output, a frame having the designated print size or an area of the image to be cut also is preferably output.

When an image having been subjected to the image processing is displayed on a monitor, a frame corresponding to the designated print size also is preferably displayed.

In order to attain the object described above, the present invention provides a certification photograph taking apparatus comprising: an inputting device for inputting an identification code indicating a use of a print.

Preferably, the inputting device for inputting a print size.

In order to attain the object described above, the present invention provodes a certification photograph creation system comprising: a certification photograph taking apparatus; an image inputting apparatus for inputting a photographed image; an image processing apparatus for extracting a main subject from the input photographed image and determining a print magnification and a frame position in accordance with a size of the main subject and a previously designated print size; and a printer for outputting an image having been subjected to the image processing as a certification photograph.

Preferably, the certification photograph taking apparatus includes an inputting device for inputting an identification code indicating a use of a print.

Preferably, the inputting device for inputting a print size.

Preferably, the image processing apparatus subjects input image data of the photographed image to predetermined image processing to create output image data of the input photographed iamge to be output as a print and includes an extracting device for extracting the main subject from the input image data and a first determining device for determining the print magnification and the frame position in accordance with the size of the extracted main subject and the previously designated print size.

Preferably, the image processing apparatus further includes a second detemining device for determining a use of the print from an identification code input when a photograph is taken.

Preferably, the print size is designated by inputting an print size together with the identification code when the photograph is taken.

When an image having been subjected to the image processing is output, a frame having the designated print size or an area of the image to be cut also is preferably output.

When an image having been subjected to the image processing is displayed on a monitor, a frame corresponding to the designated print size also is preferably displayed.

DETAILED DESCRIPTION OF THE INVENTION

A certification photograph taking apparatus, an image processing apparatus, and a certification photograph creation system according to the present invention will be described below in detail with reference to the preferable embodiments shown in the accompanying drawings.

Figure 1:
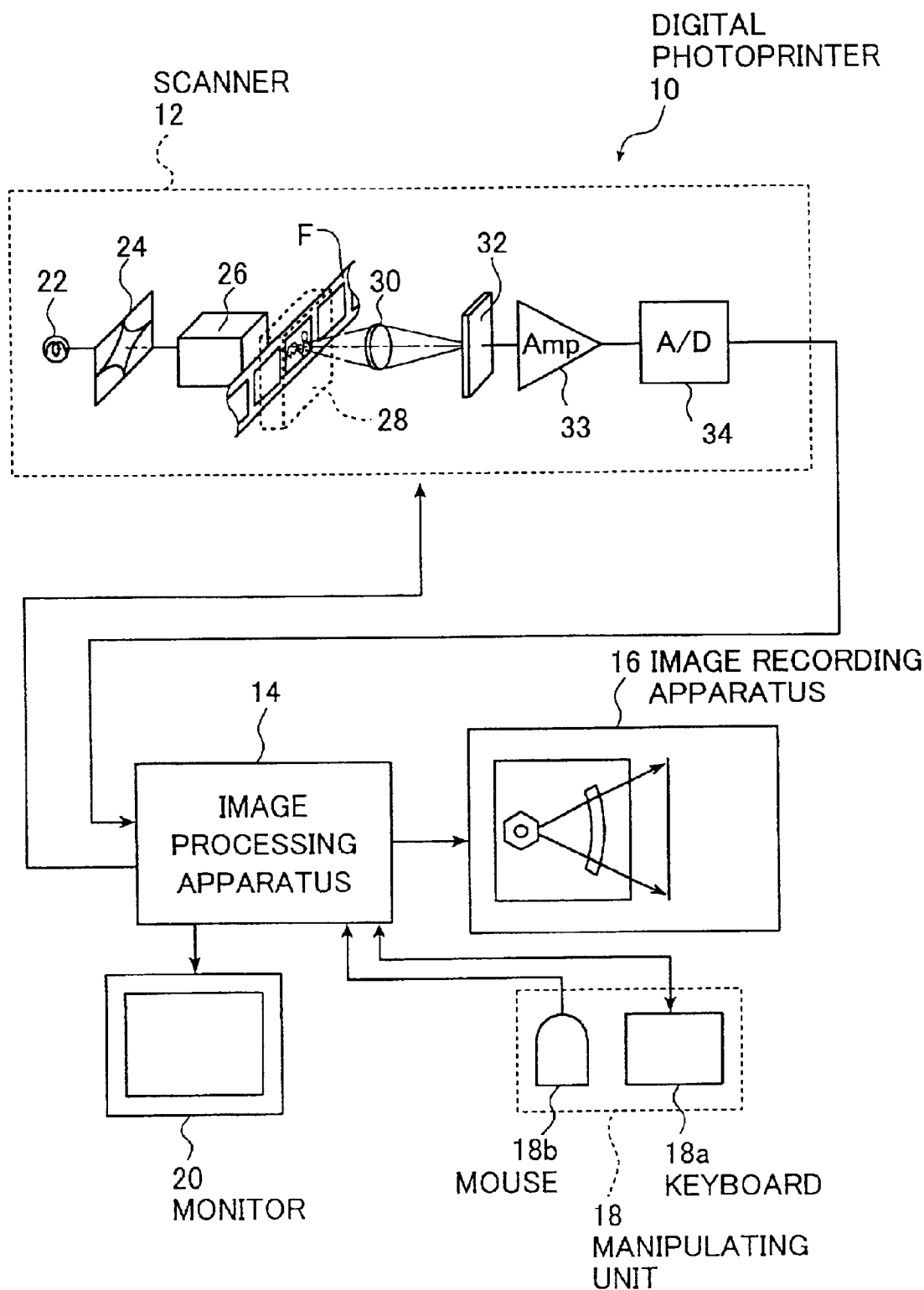
FIG. 1 is a schematic block diagram showing an embodiment of a digital photoprinter including an image processing apparatus according to an embodiment of the present invention.

FIG. 1 is a schematic block diagram showing the outline of an embodiment of a digital photoprinter including the image processing apparatus and constituting the certification photograph creation system according to an embodiment of the present invention.

The digital photoprinter shown in FIG. 1 (which is hereunder simply referred to as "photoprinter") 10 includes a scanner (image reading apparatus) 12 for photoelectrically reading an image recorded on a film F, an image processing apparatus 14, which subjects the image data read by the scanner 12 to image processing such as electronic magnification, image data edge detection, sharpness emphasis, smoothing (graininess suppression), processing for creating a certification photograph which is a feature of the present invention, and the like, and further to processing with which the photoprinter 10 as a whole is manipulated and controlled, and an image recording apparatus 16, which performs imagewise exposure of a light-sensitive material (photographic paper) with light beams modulated in accordance with the image data delivered from the image processing apparatus 14 and which performs development and other necessary processing to output a (finished) image as a print.

Connected to the image processing apparatus 14 are a manipulating unit 18 having a keyboard 18a and a mouse 18b for inputting and setting various conditions, selecting and instructing a specific processing step and entering a command and so forth for effecting color/density correction and the like, as well as a monitor 20 for displaying the image captured with the scanner 12, various manipulative commands and pictures for setting and registering various conditions.

The scanner 12 is an apparatus with which the images recorded on the film F or the like are read photoelectrically frame by frame. The scanner 12 includes an illuminant 22, a variable diaphragm 24, a diffuser box 26 which diffuses the reading light incident on the film F so that it becomes uniform across the plane of the film F, carriers 28 for the film F, an imaging lens unit 30, an image sensor 32 having 3-line CCD sensors capable of reading the image densities of R (red), G (green) and B (blue) images, an amplifier 33 and an analog to digital (A/D) converter 34.

In the photoprinter 10, the dedicated carriers 28 are available that can be loaded into the housing of the scanner 12 in accordance with the type and size of the film F used (e.g. whether it is a film of the advanced photographic system or a negative or reversal film of 135 size), the format of the film (e.g., whether it is a strip or a slide) or other factors. By replacing one carrier 28 with another, the photoprinter 10 can be adapted to process various kinds of films in various modes. The images (frames) that are recorded on the film and which are subjected to the necessary procedure for print production are transported to and held in a prescribed reading position by means of the carriers 28.

As known well, a magnetic recording medium is formed on the film used in the advanced photographic system, and a cartridge ID, a size of the film, ISO sensitivity and so forth are recorded to the magnetic recording medium. Further, various kinds of data such as a recording date when images are recorded on the film, a developing date when the film is developed, a level of exposure, types of a camera and a developing device, and the like can be recorded to the magnetic recording medium. A means for reading the magnetic information is provided with a carrier 28 corresponding to the film (cartridge) of the advanced photographic system. The magnetic information reading means reads the magnetic information when the film is transported to a reading position, and the various kinds of the information is supplied to the image processing apparatus 14.

The scanner 12 arranged as described above captures the images recorded on the film F in the following manner; the uniform reading light from the illuminant 22, which has its quantity of light adjusted by means of the variable diaphragm 24 and the diffuser box 26, is incident on the film F held in the prescribed reading position by means of the carrier 28 and thereafter passes through the film F to produce projected light bearing the image recorded on it.

It should be noted that color image signals are not limited to the signals which are input by reading light passing through the film as described above, and a reflecting document and an image recorded by a digital camera may be used as the color image signals.

The illustrated carrier 28 transports elongated films F (strips) such as a 24-exposure film of 135 size, the cartridge for the advanced photographic system, and the like.

Being held at the reading position by means of the carrier 28, the film F is transported in an auxiliary scanning direction perpendicular to a main scanning direction in which the 3-line CCD sensors for R, G and B extend and illuminated with the reading light. Consequently, the film F is subjected to two-dimensional slit scan, whereupon the image of each frame recorded on the film F is captured.

The light projected from the film F is focused by the imaging lens unit 30 to form an image on the light-receiving plane of the image sensor 32.

The R, G and B output signals from the image sensor 32 are amplified with the amplifier 33 and supplied to the A/D converter 34. In the A/D converter 34, the output signals are converted into R, B and G digital image data of, for example, 12 bits and then supplied to the image processing apparatus 14.

In the scanner 12, the images recorded on the film F are captured by two scans, the first being prescan at a low resolution (the first capture of the images) and the second being fine scan for obtaining output image data for output images (the second capture of the images).

A prescan is carried out under preset reading conditions that ensure that all the images of the film F to be processed by the scanner 12 can be read without saturating the image sensor 32.

In contrast, a fine scan uses the prescanned data and is performed under fine scan reading conditions that are set for each frame such that the image sensor 32 is saturated at a slightly lower density than the minimum density of the image (frame) of interest. The output image signals for prescan and fine scan are essentially the same data except for resolution and output image signal level.

It should be noted that the scanner 12 to be used in the photoprinter 10 is by no means limited to a type that relies upon the slit scan capturing described above but that it may be of a type that relies upon areal capturing, that is, a technique by which the entire surface of the film image in one frame is captured at a time.

In this alternative approach, an area sensor, for example, as an area CCD sensor, or the like may be used with a means for inserting R, G and B color filters interposed between the illuminant 22 and the film F. The images of the film F are separated into three primary colors and captured in the following manner; the R, G and B color filters are sequentially inserted to the light passage of the light emitted from the illuminant, the reading light, which has passed through each of the color filters, is irradiated onto the entire surface of the film F, and the entire images of the film are captured by focusing the light having passed through the filters on the area CCD sensor.

As mentioned above, the digital image data signals output from the scanner 12 are fed to the image processing apparatus 14, which embodies the image processing method of the present invention.

Figure 2:
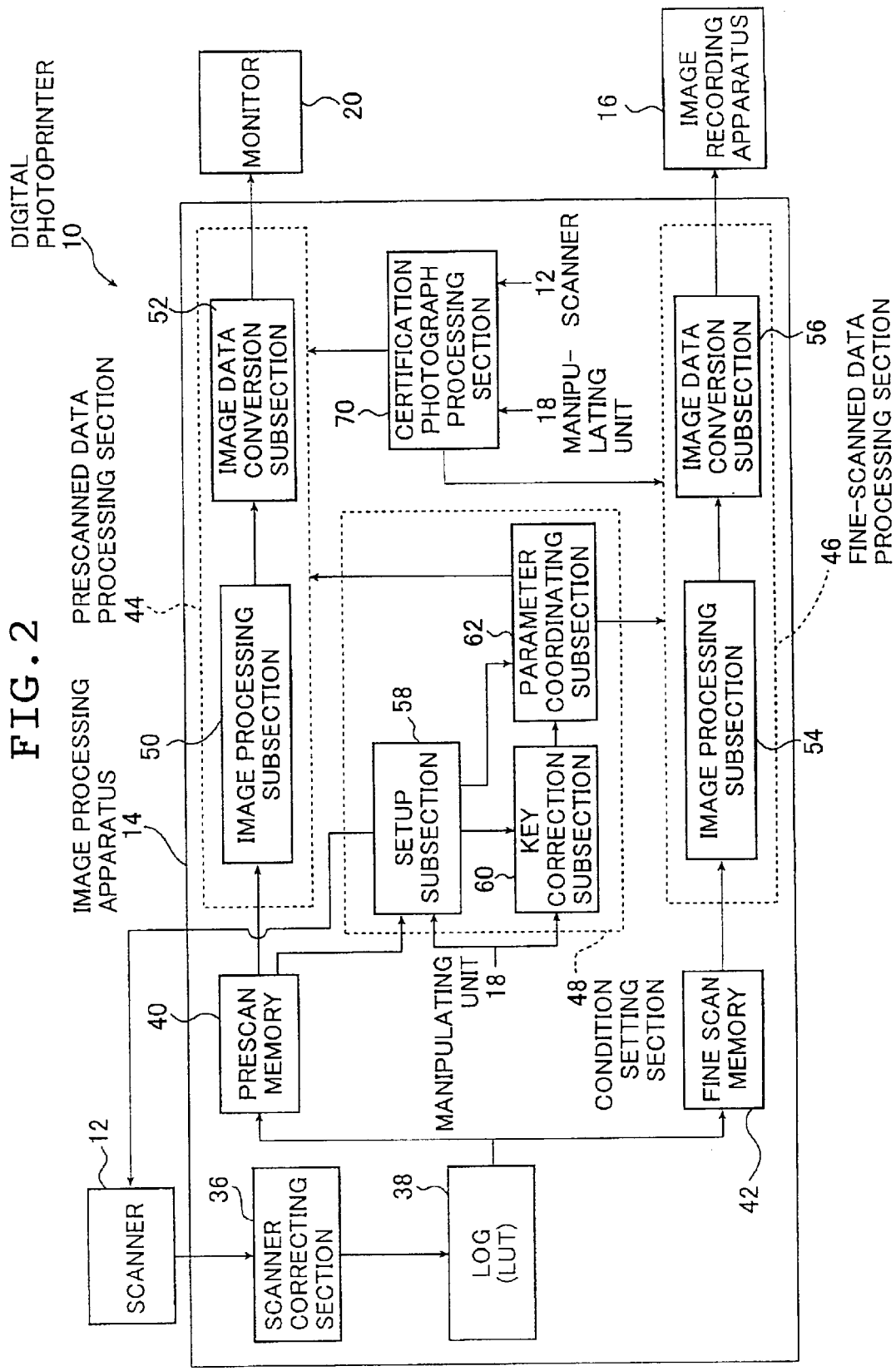
FIG. 2 is a schematic block diagram showing the image processing apparatus shown in FIG. 1.

FIG. 2 is a schematic block diagram of an embodiment of the image processing apparatus 14 of the present invention (which is hereunder simply referred to as "processing apparatus"). The processing apparatus 14 includes a scanner correcting section 36, a LOG converter 38, a prescan (frame) memory 40, a fine scan (frame) memory 42, a prescanned data processing section 44, a fine-scanned data processing section 46, and a condition setting section 48 as well as a certification photograph processing section 70.

FIG. 2 mainly shows the components relating to image processing, and besides these components, the processing apparatus 14 includes a CPU for controlling and managing the overall operation of the photoprinter 10 including the processing apparatus 14, memories for storing the information necessary for the operation and otherwise of the photoprinter 10. The manipulating unit 18 and the monitor 20 are connected to related components via the CPU and the like (CPU bus).

The R, G and B image signals, for example, the digital image data of 12 bits, which has been input from the scanner 12 to the processing apparatus 14, is supplied to the scanner correcting section 36.

The scanner correcting section 36 carries out the data correction of the captured image data such as DC offset correction, darkness correction, defective pixel correction, shading correction, and the like in order to correct the dispersion of the sensitivity of each pixel, the dark current and the like of the R, G and B digital image data, which are caused by the R, G, and B 3-line CCD sensors of the image sensor 32 in the scanner 12. The digital image signals, which have been subjected to the processing for correcting the dispersion of the sensitivity of each pixel and the dark current, are output to the LOG converter 38.

The LOG converter 38 converts the digital image data into digital image density data through logarithm conversion processing, and then converts the digital image density data into target digital image density data through gradation conversion processing. For example, the digital image data of 12 bits, which has been corrected by the scanner correcting section 36, is converted into digital image density data of, for example, 10 bits (0–1023) by means of a look-up table (LUT).

The digital image density data, which has been converted by the LOG converter 38, is stored (contained) in the prescan (frame) memory 40, if it is prescanned data, whereas the data is stored (contained) in the fine scan (frame) memory 42, if it is fine-scanned data, respectively.

The prescan memory 40 is a frame memory for containing or storing the low resolution image density data of each of R, G and B colors in one entire frame of the film F. The low resolution image density data is obtained by prescanning the film F with the scanner 12 and subjecting the data obtained by the prescan to various kinds of processing for data correction and the logarithmic conversion processing.

The prescan memory 40 must have a capacity capable of storing at least the image density data of R, G and B three colors of the image recorded on one frame of the film F. However, the prescan memory 40 may have a capacity capable of storing the image density data for a plurality of frames, or may be composed of a multiplicity of memories each having a capacity for one frame.

The prescanned image data stored in the prescan memory 40 is read into the prescanned data processing section 44.

In contrast, the fine scan memory 42 is a frame memory for containing or storing the high resolution image density data of each of R, G and B colors in one entire frame of the film F having been subjected to the various kinds of the data correction and the logarithmic conversion processing.

The fine-scanned image data stored in the fine scan memory 42 is read into the fine-scanned data processing section 46.

The prescanned data processing section 44 subjects the prescanned image data stored in the prescan memory 40 to various kinds of image processing, which is necessary to display the prescanned image data on the monitor 20. The prescanned data processing section 44 includes an image processing subsection 50 and an image data conversion subsection 52.

The image processing subsection 50 subjects the image data captured by the scanner 12 and stored in the prescan memory 40 to predetermined image processing according to the image processing conditions set by the condition setting section 48 which will be described later. Performed as the predetermined image processing are gradation correction, color conversion, density conversion, and the like which are carried out using look-up tables (hereinafter, represented by LUTs) and matrix (hereinafter, represented by MTX) operation so that a color image having desired image quality can be reproduced on the CRT display of the monitor 20.

The image data conversion subsection 52 thins out the image data having been processed by the image processing subsection 50 as necessary so that it conforms to the resolution of the monitor 20 and converts the image data into image data, which can be displayed on the monitor 20, using a 3-D (three-dimensional) LUT and the like.

In contrast, the fine-scanned data processing section 46 subjects the fine-scanned image data stored in the fine scan memory 42 to various kinds of image processing which is necessary to output the data from the image recording apparatus 16 as a color print. The fine-scanned data processing section 46 includes an image processing subsection 54 and an image data conversion subsection 56.

The image processing subsection 54 subjects the image data captured by the scanner 12 and stored in the fine scan memory 42 to predetermined image processing according to the image processing conditions set by the condition setting section 48 which will be described later so that a most appropriate image of high quality can be reproduced on a color paper in desired density, gradation and tone as a color print. For this purpose, the image processing subsection 54 subjects the image data to various kinds of image processing such as color balance adjustment, gradation adjustment, color adjustment, density adjustment, saturation adjustment, electronic magnification, sharpness emphasis (edge enhancement; sharpening), and the like by means of LUTs, MTX operation units, low-pass filters, adding/ subtracting units and the like.

The image data conversion subsection 56 converts the image data having been processed by the image processing subsection 54 into image data using a standard gradation look-up table, for example, a 3-D LUT or the like so that the image data can be recorded by the image recording apparatus 16, and the supplies the image data to the image recording apparatus 16.

The image recording apparatus 16 is used to output a finished print on which a color image is reproduced based on the image data output from the fine-scanned data processing section 46.

The condition setting section 48 sets various kinds of processing conditions in the image processing subsection 50 of the prescanned data processing section 44 and in the image processing subsection 54 of the fine-scanned data processing section 46. The condition setting section 48 includes a setup subsection 58, a key correction subsection 60 and a parameter coordinating subsection 62.

The setup subsection 58 sets the fine scan reading conditions using the prescanned image data and the like and supplies them to the scanner 12. Further, the setup subsection 58 creates (calculates) the image processing conditions of the prescanned data processing section 44 and the fine-scanned data processing section 46 and supplies them to the parameter coordinating subsection 62.

Specifically, the setup subsection 58 reads the prescanned image data from the prescan memory 40 and creates density histograms and calculates image characteristic amounts such as an average density, LATD (large area transmitting density), highlight (minimum density), shadow (maximum density), and the like from the prescanned image data.

The fine scan reading conditions, for example, the quantity of light of the illuminant 22, the diaphragm amount of the variable diaphragm 24, the accumulation time of (the R, G, and B 3-line CCD sensors) of the image sensor 32, and the like are set from the thus calculated image characteristic amounts so that the image sensor 32 is saturated at a density which is a little lower than the minimum density of the image. Note that the fine scan reading conditions may change all the factors corresponding to the output level of the image sensor 32, may change only any one of the factors such as the diaphragm value and the like or may change only a plurality of factors such as the diaphragm value, the accumulation time and the like, with respect to the prescan reading conditions.

Further, the setup subsection 58 sets the image processing conditions such as the above-mentioned color balance adjustment, gradation adjustment and the like in response to the density histograms and the image characteristic values and to a command of an operator which is issued when necessary, and the like.

The key correction subsection 60 calculates the amount of adjustment (for example, the amount of correction and the like of LUTs) of the image processing conditions in accordance with the density (brightness), color, contrast, sharpness, saturation and the like which are set by the keyboard 18a and keys (not shown) disposed to the manipulating unit 18 and various kinds of commands and the like input through the mouse 18b, sets parameters, and sends them to the parameter coordinating subsection 62.

The parameter coordinating subsection 62 receives the image processing conditions set by the setup subsection 58, sets the image processing conditions supplied thereto to the image processing subsection 50 of the prescanned data processing section 44 and to the image processing subsection 54 of the fine-scanned data processing section 46, and further corrects (adjusts) the image processing conditions set to the respective subsections in accordance with the amounts of adjustment calculated in the key correction subsection 60 or sets the image processing conditions again.

The image processing apparatus and the certification photograph creation system composed of the digital photoprinter utilizing the image processing apparatus are basically arranged as described above. When an operator indicates (inputs a command) to create a certification photograph in response to a request from a customer or when it is designated by an identification code that a photograph is used as a certification photograph, the processing apparatus 14 starts certification photograph creation processing. The certification photograph creation processing is carried out in the certification photograph processing section 70.

Operation of a first embodiment of the present invention will be described below.

Figure 3:
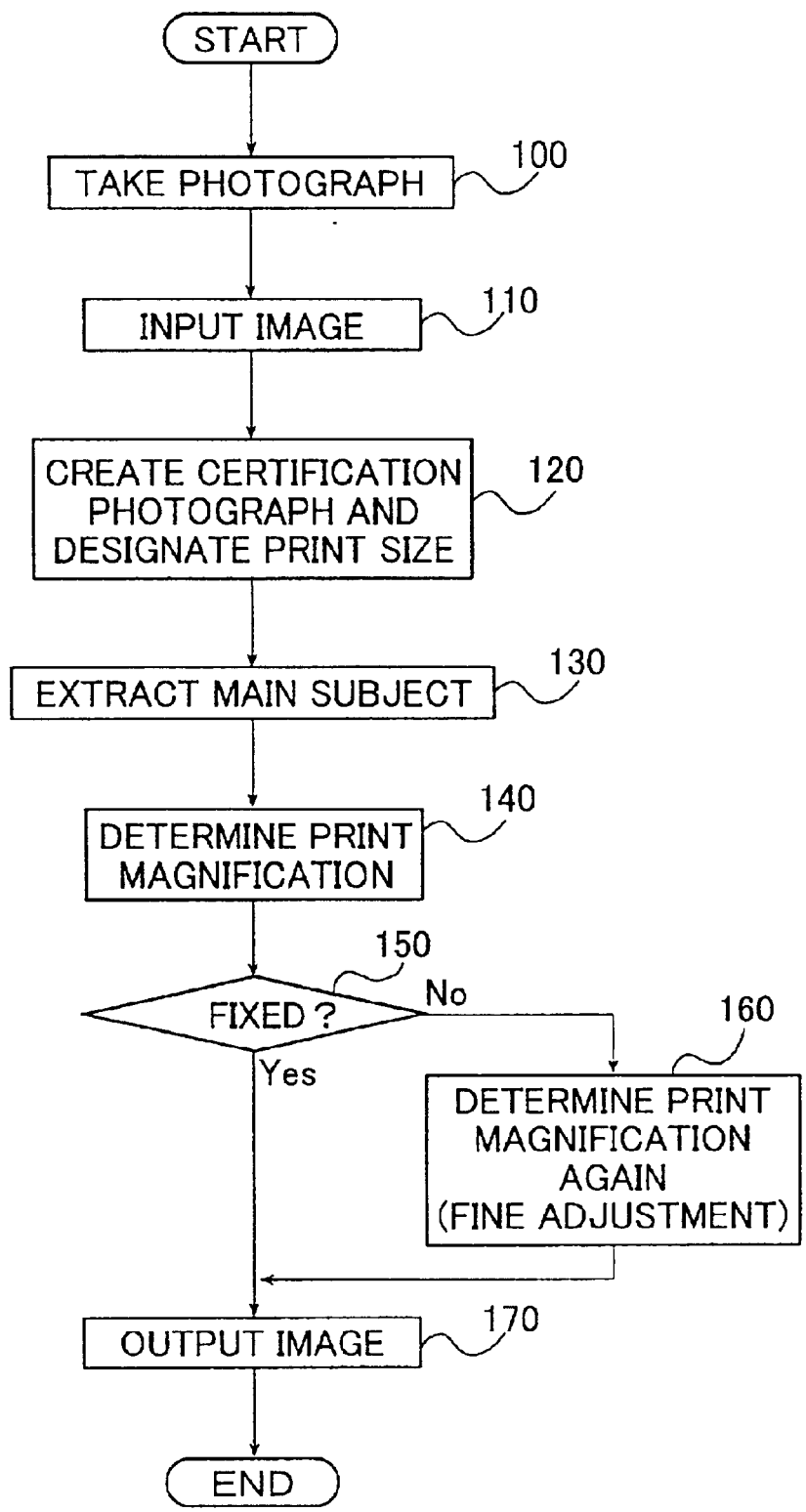
FIG. 3 is a flowchart showing an example of the flow of processing of a first embodiment of the present invention.

In the first embodiment, a certification photograph is created from a photographic film when a customer requests to create the certification photograph from the photographic film on which an image was recorded by the customer through his or her optional photographing device (camera) without setting an identification code, when the image was recorded, for indicating that the photograph created from the film is used as the certification photograph. In the first embodiment, no identification code is not set to indicate that the photograph is used as the certification photograph. Thus, an operator, who is requested to create the certification photograph, inputs that the photograph is used as the certification photograph and the print size of the certification photograph The operation will be described below with reference to the flowchart of FIG. 3.

At step 100, a customer records a photograph for creating a certification photograph using an optional photographing device (camera). The camera used in the photographing is not particularly limited and any of a single-lens reflex camera, a compact camera, a digital camera, a lens-fitted photographic film package (LF), and the like may be used.

When the customer requests a photo-labo to create a certification photograph from a film on the image of a person is recorded at step 110, the image of the person is input from the film through the scanner 12. In the request, when the size of the certification photograph is specified as in a passport a driver's license and the like, the customer designates that the photograph created from the film is the certification photograph. Otherwise, the customer designates that the photograph created from the film is the certification photograph and the size of the certification photograph.

Next, at step 120, the operator selects the image designated by the customer on a verification picture and issues a command for starting the certification photograph creation processing. At this time, the picture on the monitor 20 is changed to a picture 80 for the certification photograph creation processing as shown in, for example, FIG. 4.

The image displayed on the verification picture of the monitor 20 is not limited to the prescanned image data processed in the image processing subsection 50 as described above and may be fine-scanned image data when an image is input from the film as described above, in addition to the prescanned image data. Further, when an image is input digitally, the image may be a recorded image itself (recorded by a digital camera or the like), and when image data is directly input, the image may be the input image itself. However, when prescanned image data is used and the following change is applied thereto, the position of the prescanned image data must be changed to the cut position determined using finally-scanned image data and the print magnification of the prescanned image data must be changed to that of the finally-scanned image data.

Figure 4:
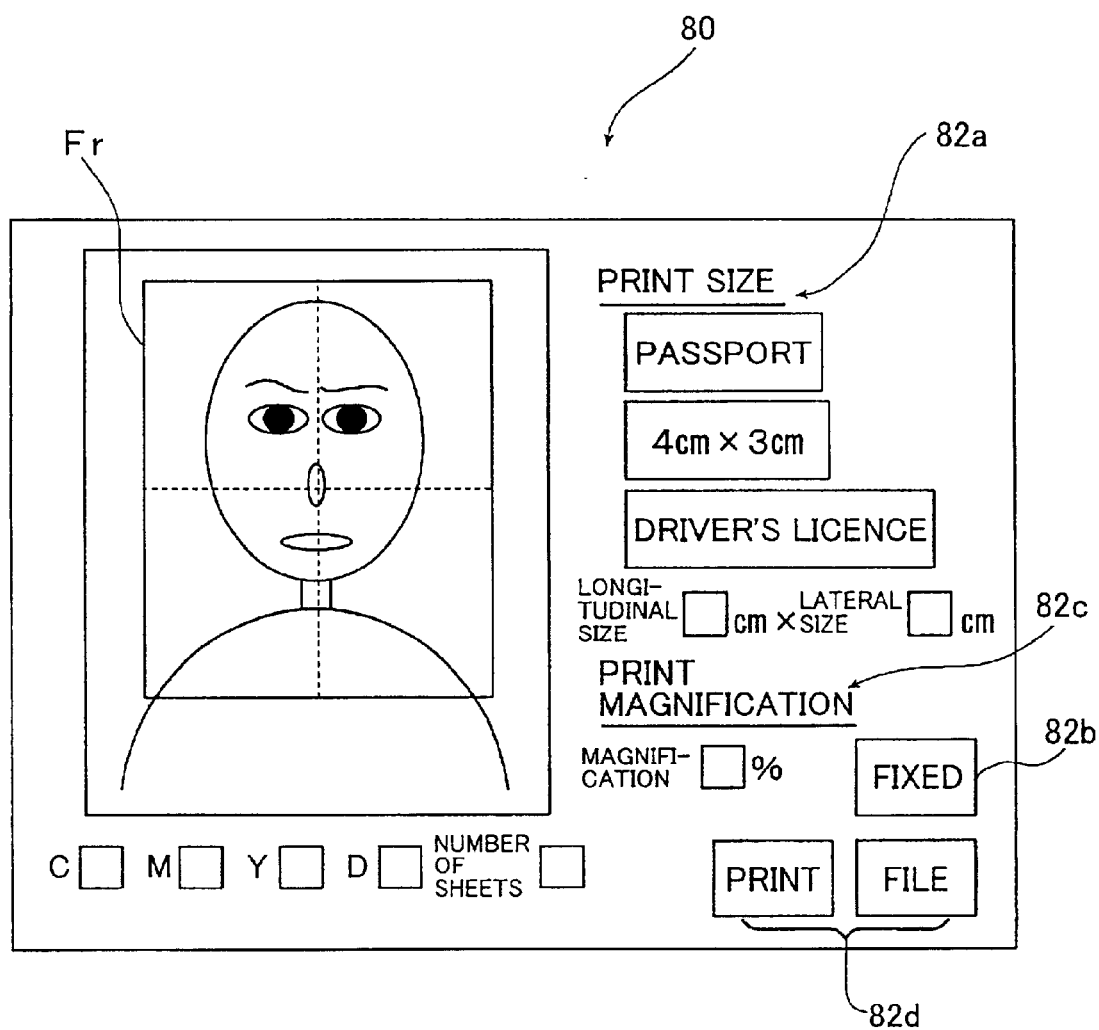
FIG. 4 is a view explaining an example of a displayed image for performing certification photograph creation processing of the present invention.

In the certification photograph creation processing picture 80 of FIG. 4, the operator designates a print size by clicking a print size key 82a. The print size may be designated from a preset print size as in the case of the passport, the driver's license and the like, otherwise it may be directly designated by a vertical size and a horizontal size of a print shown by A×B. When the print size key 82a is clicked, a frame corresponding to a print size designated by the operator is displayed on the monitor 20 by a broken line.

Thereupon, a main subject is extracted from the input image in the certification photograph processing section 70 at step 130. A method of extracting the main subject is not particularly limited, and it is automatically extracted by a known method, for example, methods disclosed in Japanese Unexamined Patent Application Publication No. 8-184925 and the like. Otherwise, the operator may manually extract it while observing a picture, or the operator may designate a portion of the main subject, designate the main subject by surrounding it with a rectangular frame and then extract the main subject again from the information thereof. This operation will be effective when the main subject cannot be correctly extracted, in particular, when it is automatically extracted.

Further, after the main subject is extracted, it is more preferable to locate the main subject at the center of a picture by automatic framing and the like.

When the main subject is extracted in the certification photograph processing section 70, the size of the extracted main subject is compared with the print size designated previously at next step 140, and a print magnification is automatically determined so that the main subject has a size optimum to a necessary print size. Simultaneously, a frame position Fr is determined so that the main subject is located at the center of the frame as shown in FIG. 4.

Note that the automatic extraction of the main subject fails, the operator manually sets a print magnification and a trimming range.

Next, when the operator determines that the image displayed on the monitor 20 is acceptable, he or she clicks a fixing key 82b to fix the output conditions of an output image at step 170. Whereas, when the operator determines that an adjustment is necessary a little more at step 150, he or she can perform a fine adjustment by changing the print magnification by means of a print magnification key 82c or by moving a print frame at step 160.

Image processing is carried out in the image processing subsection 54 under the processing conditions, which are set as described above, for the creation of the certification photograph, and the certification photograph is output. The destination of the output is designated through a destination key 82d which indicates a print or a file.

Figure 5A:
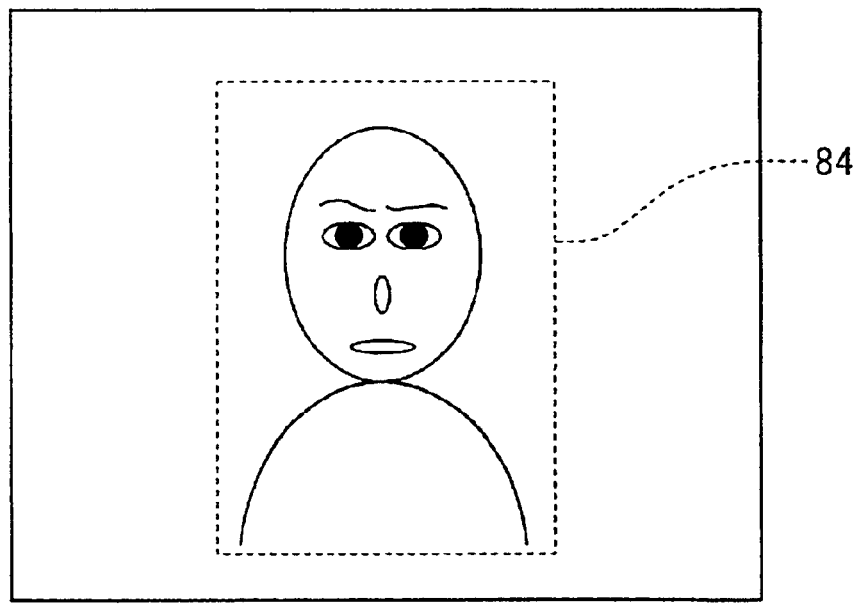
FIGS. 5A and 5B are views explaining output examples of the prints of certification photographs.
Figure 5B:
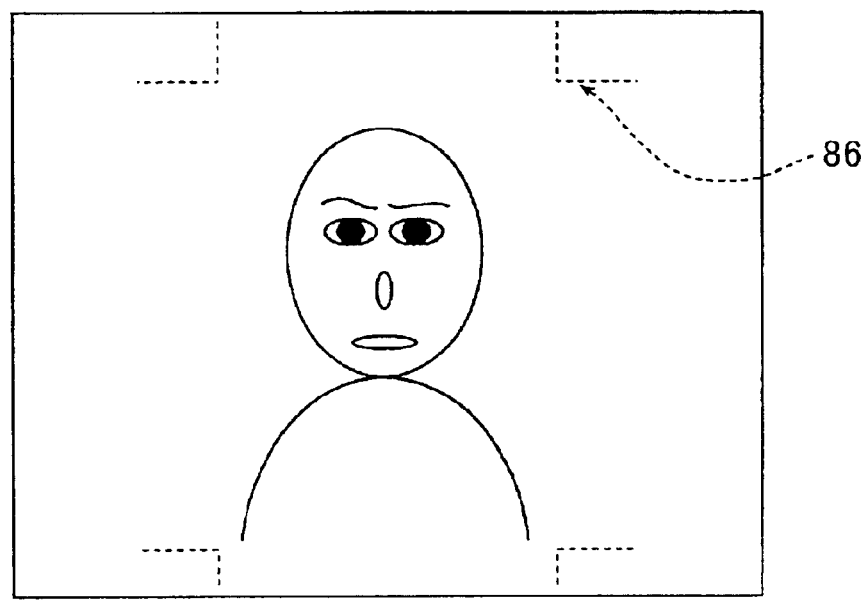

FIG. 5 shows an example of an output print output as the certification photograph. In FIG. 5A, a photograph having a frame 84 of a broken line surrounding a main subject is output, and a customer cuts the photograph along the broken line and uses it as a certification photograph. Further, in FIG. 5B, a photograph is output which has a so-called resister marks 86 used in printing and the like in place of the frame. Otherwise, a photograph may be output in a size, which need not be cut, from the beginning.

Further, it is more preferable to create a photograph having color and density which are optimum to a certification photograph by making a face to bright and warm color or density by the adjustment of, for example, the center of color balance.

It should be noted that it is a problem in the certification photograph that the look of a subject is extremely changed from the property thereof. Thus, a degree of correction made by digital image processing or a statement that no correction is applied may be printed on a back print or an image surface or buried as a dot pattern or the like which is made unvisible making use of a human sight characteristics.

Next, a second embodiment of the present invention will be described.

In the second embodiment, a photographing device having an identification code for indicating that a photograph taken thereby is used as a certification photograph, that is, a recording device capable of inputting an identification code showing a certification photograph is used so that the certification photograph creation processing can be automatically started making use of the identification code.

Figure 6:
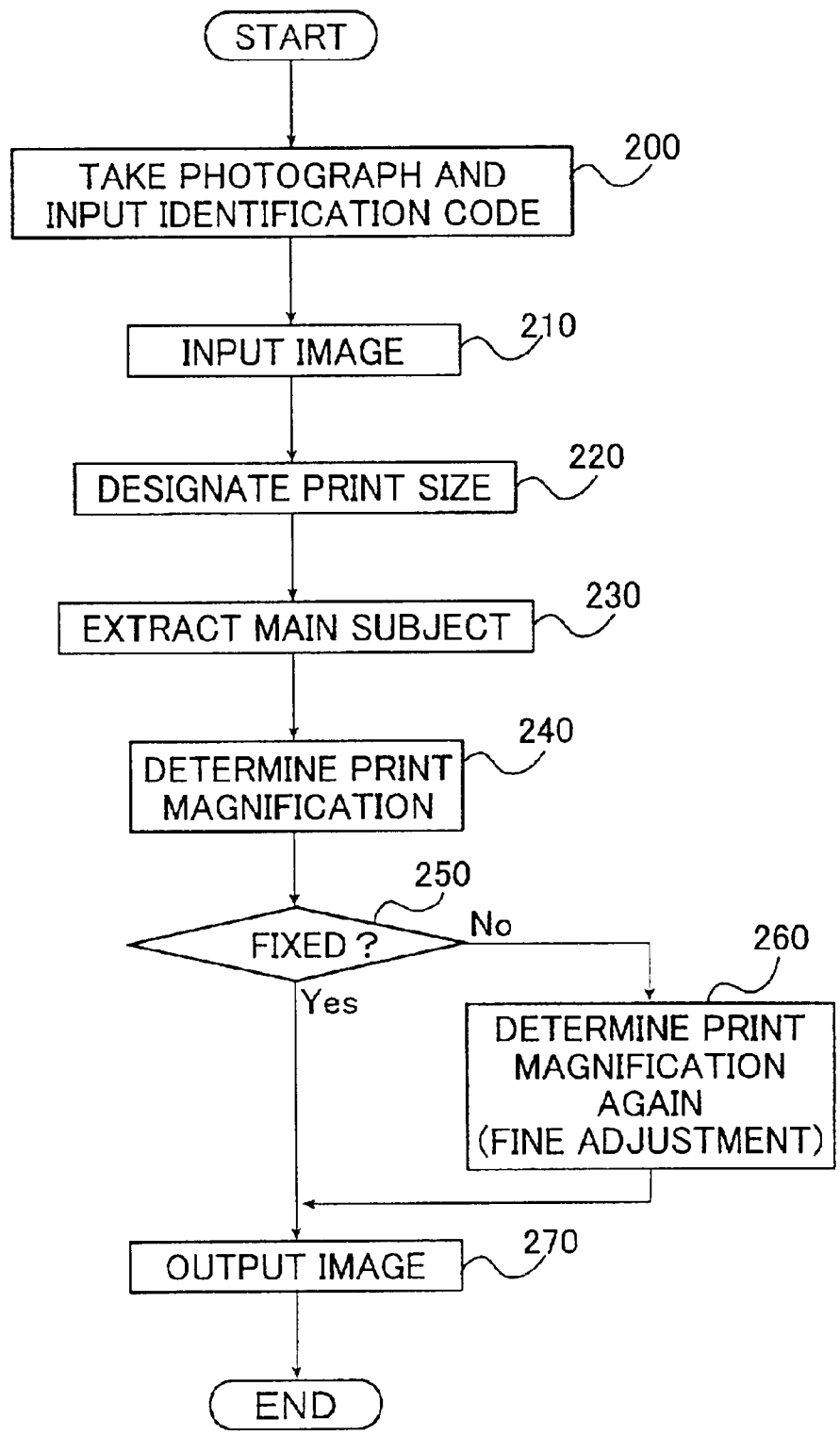
FIG. 6 is a flowchart showing an example of the flow of the processing performed by a second embodiment of the present invention.

Operation of the second embodiment will be described below with reference to the flowchart of FIG. 6.

First, at step 200, a customer takes a photograph for certification using a camera to which an identification code indicating that the photograph is used for certification can be input. When it is designated that a photograph taken by the camera is a certification photograph by inputting the identification code in photographing, the identification code, which indicates that a frame on which an image is recorded at the time is used to create the certification photograph, is recorded on a film or a Patrone, or a recording medium optically, magnetically or electrically. Further, it is preferable to display a frame that shows a size of the certification photograph as shown in FIG. 7 by a broken line 88 or the like in the finder of the camera because framing can be easily carried out thereby when a certification photograph is taken.

A size of the frame is displayed in accordance with each print size. An image can be recorded in an optimum size from the beginning of photographing by recording the image with reference to the frame. Further, in a digital camera, the frame may be displayed on a liquid crystal monitor. The frame is changeable depending upon a focal length.

Figure 7:
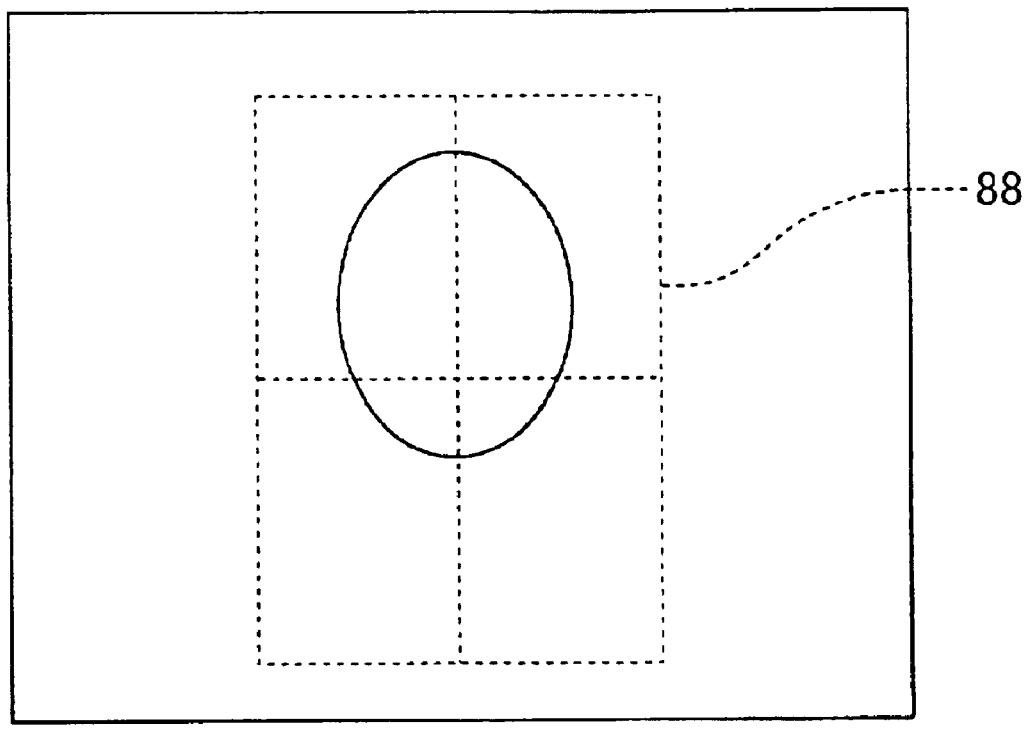
FIG. 7 is a view explaining an example of a certification photograph adapter used by a photographing device according to the present invention.

Further, a screen-like adapter, in which a frame as shown in, for example, FIG. 7, may be set on a finder as a certification photograph adapter. It is preferable to prepare the adapter for each size of certification photograph and to set it on the finder so that the frame of each certification photograph size can be observed and an image can be recorded so as to be located within the frame. At this time, a camera-to-subject distance is fixed.

When a customer requests a photo-labo to create a certification photograph from a photographic film on which an image has been recorded, he or she informs the photo-labo of a print size.

At step 210, the image recorded on the film is captured and input as well as the identification code is read. At the time, in, for example, an advanced photo system, the identification code is recorded on the magnetic recording medium of the film and read by the magnetic information reading means of a carrier 28. When the magnetic reading means reads the identification code and it is determined that the image is used for a certification photograph, the certification photograph processing section 70 starts the certification photograph creation processing. Reading of the identification code permits the certification photograph creation processing to be automatically started, thus it is not necessary for an operator to designate the image used for the certification photograph through a verification picture. Then, the image for certification photograph is selected and displayed on the monitor 20 similarly to FIG. 4.

Note that various types of reading means are prepared in accordance with the recording mediums of the identification code.

When the operator indicates a print size on the picture displayed on the monitor 20 at next step 220, a main subject is extracted at step 230. Subsequent processing steps are entirely the same as those of step 140 and the subsequent steps of the first embodiment.

That is, at step 240, a print magnification, by which the main subject is set to a size optimum to the designated print size is determined from the size of the extracted main subject and the designated print size, and the main subject is output. Then, the operator determines at step 250 whether or not the print magnification is acceptable while observing the main subject displayed on the monitor 20. When the print size is acceptable, the process goes to step 270, at which step output image conditions are fixed, whereas when it is not acceptable, a fine adjustment is applied to the print magnification and an optimum print magnification is determined again at step 260.

Next, a third embodiment of the present invention will be described.

While the third embodiment employs a photographing device capable of inputting an identification code for indicating that a photograph taken thereby is used for certification similarly to the second embodiment, the recording device of the third embodiment can further input a print size in addition to the identification code. That is, the print size is recorded on a film or a Patrone, or a recording medium optically, magnetically or electrically together with the identification code.

Therefore, an operator need not designate the print size, which permits the certification photograph creation processing to be carried out entirely automatically in the third embodiment because. The operator can simply create a certification photograph only by performing a confirmation job finally.

Figure 8:
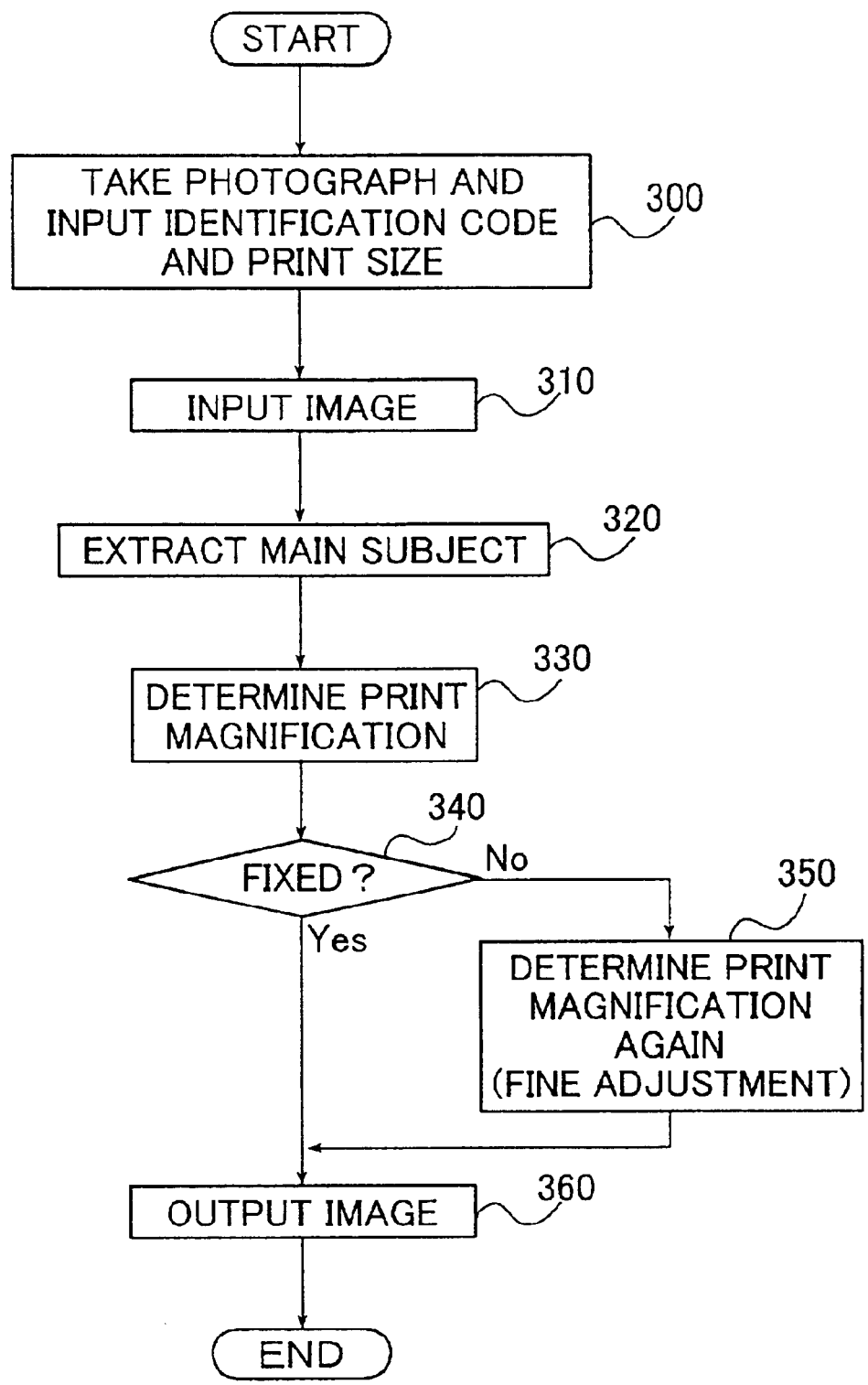
FIG. 8 is a flowchart showing an example of the flow of processing performed by a third embodiment of the present invention.

Operation of the third embodiment will be described below with reference to the flowchart of FIG. 8.

First, at step 300, a customer takes a photograph for certification using a camera to which an identification code indicating that the photograph is used as a certification photograph can be input. When the photograph is taken, the customer inputs the identification code, which indicates that the photograph taken by the camera is used as the certification photograph, and the print size.

At step 310, when the customer requests the creation of the certification photograph from a photographic film on which an image, the identification code and the print size are recorded, the image is captured as well as the identification code and the print size are captured.

In the third embodiment, not only the identification code indicating the certification photograph but also the print size are given from the data recorded on the film or other recording mediums, which causes the certification photograph creation processing to be automatically started to a frame of the film on which the image used for the certification photograph is recorded without the need of the command of the operator.

That is, a main subject is extracted at step 320 and a print magnification is determined at step 330. The confirmation (step 340), the fine adjustment (step 350) and setting of output image conditions (step 360) which are performed by the operator are the same as those in the first and second embodiments.

As described above, according to the embodiments described above, a certification photograph can be simply taken and created by an easy operation.

In particular, the present invention can be very conveniently applied to a digital camera containing a printer (for example, "Fine Pix PR21 Pricam" made by Fuji Photographic Co. Ltd.) and the like because a certification photograph can be created simultaneously with the record of an image.

Note that while the electronic magnification is used as the print magnification in the above embodiments, an optical magnification my be used in place of it. That is, it is also possible to extract a main subject in a direct-exposing type printer, to determine the location thereof and to print the main subject by optical zooming.

While the certification photograph taking apparatus, the image processing apparatus and the certification photograph creation system of the present invention have been described above in detail, the present invention is by no means limited to the above-described embodiments and it goes without saying that various improvements and modifications can be made within the range which does not depart from the gist of the present invention.

As described above, according to the present invention, a certification photograph can be taken and/or created simply and easily.

What is claimed is:

1. An image processing apparatus for subjecting input image data to predetermined image processing to create output image data to be output as a print comprising:

an extracting device for extracting a main subject from said input image data; and a first determining device for determining a print magnification and a frame position in accordance with a size of said extracted main subject and a previously designated print size.

2. The image processing apparatus according to claim 1, further comprising a second detemining device for determining a use of said print from an identification code input when a photograph is taken.

3. The image processing apparatus according to claim 2, wherein said print size is designated by inputting an print size together with said identification code when said photograph is taken.

4. The image processing apparatus according to claim 1, wherein when an image having been subjected to said image processing is output, a frame having said designated print size or an area of said image to be cut also is output.

5. An image processing apparatus according to claim 1, wherein when an image having been subjected to said image processing is displayed on a monitor, a frame corresponding to said designated print size also is displayed.

6. A certification photograph creation system comprising:

a certification photograph taking apparatus;

an image inputting apparatus for inputting a photographed image;

an image processing apparatus for extracting a main subject from said input photographed image and determining a print magnification and a frame position in accordance with a size of said main subject and a previously designated print size; and a printer for outputting an image having been subjected to said image processing as a certification photograph.

7. The certification photograph creation system according to claim 6, wherein said certification photograph taking apparatus includes an inputting device for inputting an identification code indicating a use of a print.

8. The certification photograph creation system according to claim 7, wherein said inputting device for inputting a print size.

9. The certification photograph ceration system accoding to claim 6, where in the image processing apparatus subjects input image data of said photographed image to predetermined image processing to create output image data of said input photographed iamge to be output as a print and includes an extracting device for extracting said main subject from said input image data and a first determining device for determining said print magnification and said frame position in accordance with said size of said extracted main subject and said previously designated print size.

10. The certification photograph creation system according to claim 9, wherein said image processing apparatus further includes a second detemining device for determining a use of said print from an identification code input when a photograph is taken.

11. The certification photograph creation system according to claim 10, wherein said print size is designated by inputting an print size together with said identification code when said photograph is taken.

12. The certification photograph creation system according to claim 9, wherein when an image having been subjected to said image processing is output, a frame having said designated print size or an area of said image to be cut also is output.

13. The certification photograph creation system according to claim 9, wherein when an image having been subjected to said image processing is displayed on a monitor, a frame corresponding to said designated print size also is displayed.

* * * * *